Patented July 18, 1944

2,353,997

UNITED STATES PATENT OFFICE 2,353,997

MANUFACTURE OF THIOUREA

Robert H. Cooper, Nitro, W. Va., assignor to Monsanto Chemical Company, St. Louis, Mo., a corporation of Delaware No Drawing. Application September 22, 1941, Serial No. 411,883

2 Claims. (Cl. 260—552)

The present invention relates to the production of thiourea.

It is known that thiourea can be produced by the interaction of a cyanamide and an inorganic sulfide, hydrogen sulfide, calcium sulfide, barium sulfide and ammonium sulfide all having been proposed for reaction either with free cyanamide or salts thereof as for example alkaline earth metal salts, to produce thiourea.

Unfortunately the cyanamides are easily decomposed and readily undergo rearrangement to dicyandiamid and other products. While it has been proposed to carry out the thiourea synthesis at low temperatures in order to avoid the formation of undesirable by-products, the time required for reaction is then unduly prolonged. It has been found more economical to maintain the inorganic sulfide in large excess over the amount required to combine with all of the cyanamide present in the reaction zone since under these conditions the reaction can be conducted at elevated temperature without the formation of undesirable by-products. In other words the speed of the desired reaction has been found to be increased so enormously that the side reactions are negligible. Best results have been obtained by conducting the reaction at 80–95° C. Obviously the unreacted portion of the inorganic sulfide must be recovered for future use or accepted as a complete loss. Of course even the time and expense of recovery represent an appreciable item.

In accordance with the present invention it has been discovered that substantially stoichiometric amounts of a cyanamide and an inorganic sulfide can be converted into thiourea by maintaining a large excess of inorganic sulfide throughout the greater part of the reaction and then finishing off the reaction by adding a cyanamide in an amount such as to render the total only slightly below the stoichiometric equivalent of the inorganic sulfide. The reaction is almost instantaneous at elevated temperatures and at 100° C. or below the transfer of thiourea into thiocyanate is negligible.

From the standpoint of cheapness of reactants the interaction of hydrogen sulfide and crude calcium cyanamide is particularly attractive. The reaction follows with reasonable conformity the equation:

(1) 

or in the dry, (2) 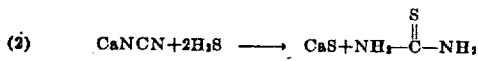

In the preferred operation of the invention, an alkaline earth metal cyanamide and hydrogen sulfide are simultaneously introduced into a hot aqueous medium the hydrogen sulfide being in stoichiometric excess throughout the entire reaction and in large excess throughout the greater part of the reaction. However, the addition of cyanamide is continued after the addition of the hydrogen sulfide until the total amount is only slightly less than the stoichiometric equivalent of the hydrogen sulfide. While at every stage of the reaction there is present hydrogen sulfide in amount greater than required to react with all of the cyanamide present in the reaction zone, the total quantities reacted are in almost equal molecular proportions. In two runs identical in every respect except that in one the hydrogen sulfide was kept at from 50–60% excess of that theoretically required whereas the other was conducted as outlined above, the yield and purity of thiourea were identical.

Where fertilizer grade calcium cyanamide is used considerable quantities of carbon and, as appears from Equation 1, calcium hydroxide are produced as well as small amounts of other ingredients. The lime being gelatinous and slimy renders filtration difficult and if the batch is neutralized and all of the calcium precipitated together as calcium sulfate or other insoluble salt the bulk of precipitate is greatly increased and a serious filtering problem still remains. However it has ben further found in accordance with this invention that the reaction cycle is speeded up and the quantity of thiourea which can be produced in a given plant is increased by adding only about half of the total cyanamide to be reacted, filtering the charge without neutralizing, then adding the other half of the cyanamide and, at a reduced rate, hydrogen sulfide. At the half way stage the hydrogen sulfide is in large excess probably as $Ca(SH)_2$. In this connection it will be noted that Equation 1 fails to show the formation of $Ca(SH)_2$, $CaS$ and $Ca(OH)SH$, all of which are undoubtedly present. The bulk of the lime, carbon and other solids is not so great as to impede filtering so that after a short filtering operation a clear filtrate is obtained ready for the second half of the reaction. It is important to note that the excess of hydrogen sulfide in whatever form it may exist is available for reaction with additional cyanamide. Accordingly, the flow of hydrogen sulfide can be stopped altogether while the final portions of cyanamide are added. When the total hydrogen sulfide is only slightly in excess of the cyanamide the remainder of the calcium is precipitated as sulfate or other insoluble salt and thiourea recovered from the filtrate in known manner.

Example

About 1250 lbs. of water are charged into an iron reactor of suitable capacity. It is preferred to dissolve some hydrogen sulfide in this water before adding any cyanamide but if desired the addition of both reactants may be started simultaneously. Alternatively a small amount of lime may be added to the water and enough hydrogen sulfide added to convert the lime to calcium hydrosulfide. The charge is heated to 85–90° C. and gaseous hydrogen sulfide run in at a fairly rapid rate. Simultaneously therewith crude dry fertilizer grade calcium cyanamide of about 60% purity is gradually run in by means of a screw conveyer. In this manner 400 lbs. of calcium cyanamide are brought into reaction. The hydrogen sulfide is measured by means of a suitable flow meter and the rate of flow is so adjusted that an excess is always present. After a portion, say one-fourth of the calcium cyanamide has been added the rate of addition of hydrogen sulfide is decreased somewhat but after 400 lbs. of cyanamide have been added the excess of hydrogen sulfide should still be from 25% to 50% above that theoretically required to convert all of the cyanamide to thiourea (Equation 1 above).

The charge is then fed in a continuous stream into a centrifuge and the filter cake washed with water. The filtrate and washings are pumped back into a reactor, the temperature again adjusted to 85–90° C. and the addition of hydrogen sulfide and calcium cyanamide continued, the rate of addition of the former being reduced still further and stopped altogether during the addition of the past portions of the cyanamide. By the time another 400 lbs. of calcium cyanamide have been added the total hydrogen sulfide should be only 2.5 to 5.0% above the theoretical requirement. Thus based on the overall reaction an excess of about 60% is built up and maintained during about the first quarter of the reaction. By the time the half way mark is reached the excess is about 30% and at the three quarter mark about 17%.

The complete batch is fed in a continuous stream into a centrifuge, the filter cake washed with water and the filtrate and washings pumped into a glass lined neutralizing tank. 68% sulfuric acid is fed slowly into the neutralizer until the charge is faintly acid (pH 6.6). The temperature is raised to 80° C. and after a short period of heating and stirring the sulfate cake is filtered off preferably by means of a centrifugal wringer with cast aluminum basket. If necessary the filtrate is recirculated back through the neutralizer and when perfectly clear is pumped into a concentrator. The cake is washed with hot water and the washings also pumped to the concentrator. Crystals of thiourea are obtained after removing a portion of the water, cooling and filtering. Before the separation of the thiourea however it is advisable to run the hot concentrated solution through a filter to remove additional small amounts of impurities which frequently separate as the solution is concentrated. Thiourea of high purity is obtained directly from the concentrated solution. The yield is excellent.

While the above indicates a preferred form of the improved process it is to be understood that numerous changes can be made as for example in the kind of the ingredients used, the mode of addition or association of the ingredients and in the temperature and pressure adopted for effecting reaction. Such deviations can be made by those skilled in the art without departing from the principles outlined above and are within the scope of the invention as set forth in the claims attached hereto as part of the present specification.

What is claimed is:

1. In the process of making thiourea by reacting calcium cyanamide with hydrogen sulfide the steps of initiating the reaction by adding calcium cyanamide to hydrogen sulfide in an amount substantially greater than the stoichiometric equivalent of the calcium cyanamide added to the reaction zone, maintaining throughout the reaction and any subsequent additions of the reactants, the hydrogen sulfide in stoichiometric excess of the total calcium cyanamide present in the reaction zone at any time and finally converting nearly all of the hydrogen sulfide to thiourea by adding further calcium cyanamide.

2. In the process of making thiourea by reacting calcium cyanamide with hydrogen sulfide the steps of initiating the reaction by adding calcium cyanamide to a hot aqueous medium containing hydrogen sulfide in an amount substantially greater than the stoichiometric equivalent of the calcium cyanamide added to the reaction zone, maintaining throughout the reaction and any subsequent additions of the reagents, the hydrogen sulfide in stoichiometric excess of the total calcium cyanamide present in the reaction zone at any time and finally converting nearly all of the hydrogen sulfide to thiourea by adding further calcium cyanamide.

ROBERT H. COOPER.